(12) United States Patent
Katakura

(10) Patent No.: US 6,980,678 B2
(45) Date of Patent: Dec. 27, 2005

(54) IMAGE INFORMATION PROCESSING SYSTEM

(75) Inventor: Yukiko Katakura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 661 days.

(21) Appl. No.: 10/244,508

(22) Filed: Sep. 17, 2002

(65) Prior Publication Data

US 2003/0053719 A1    Mar. 20, 2003

(30) Foreign Application Priority Data

Sep. 17, 2001   (JP) .............................. 2001-282284

(51) Int. Cl.$^7$ .............................. G06K 9/00; G06K 9/60
(52) U.S. Cl. ..................................... 382/128; 382/306
(58) Field of Search ............................... 382/128–132, 382/305, 306

(56) References Cited

U.S. PATENT DOCUMENTS

| | | | | |
|---|---|---|---|---|
| 4,739,480 | A | * | 4/1988 | Oono et al. ................. 250/584 |
| 5,335,172 | A | * | 8/1994 | Matsumoto et al. ......... 250/582 |
| 5,384,785 | A | * | 1/1995 | Yoda .......................... 714/746 |
| 6,548,823 | B2 | * | 4/2003 | Nagatsuka et al. .......... 250/584 |
| 6,771,385 | B1 | * | 8/2004 | Iizuka et al. ................ 358/1.15 |
| 2002/0001401 | A1 | * | 1/2002 | Bocionek .................... 382/128 |
| 2002/0102012 | A1 | * | 8/2002 | Keller et al. ................ 382/128 |

FOREIGN PATENT DOCUMENTS

| | | |
|---|---|---|
| JP | 55-12429 | 1/1980 |
| JP | 56-11395 | 2/1981 |
| JP | 56-11397 | 2/1981 |
| JP | 63-253348 | 10/1988 |
| JP | 1-227139 | 9/1989 |
| JP | 4-123173 | 4/1992 |
| JP | 4-155581 | 5/1992 |
| JP | 2002-158820 | 5/2002 |

* cited by examiner

Primary Examiner—Jingge Wu
Assistant Examiner—Anthony Mackowey
(74) Attorney, Agent, or Firm—Sughrue Mion, PLLC

(57) ABSTRACT

The image information processing system includes at least one image information processing apparatus, and at least one identification information registration specialized apparatus having no image confirmation function, at least one image information reading apparatus and means for establishing network-connection among these apparatuses. One image information processing apparatus automatically receives the image information read by one image information reading apparatus from the sheet having the registered identification information and performs image confirmation using its own image confirmation function, and if the image information is read from the sheet having the identification information registered by one identification information registration specialized apparatus, the image information processing apparatus confirms which identification information registration specialized apparatus registered the identification information, internally registers the identification information automatically receives the image information from one image information reading apparatus, and performs the image confirmation.

4 Claims, 7 Drawing Sheets

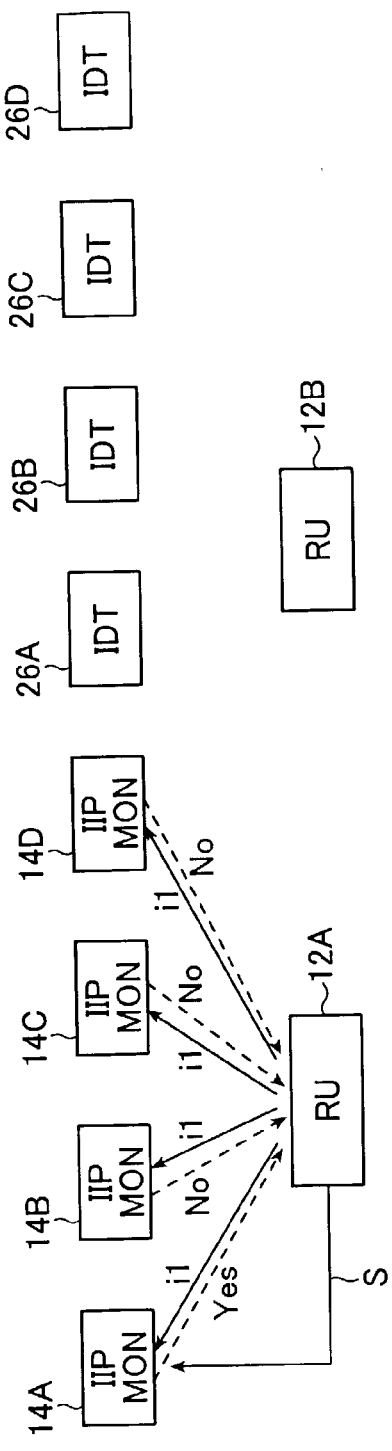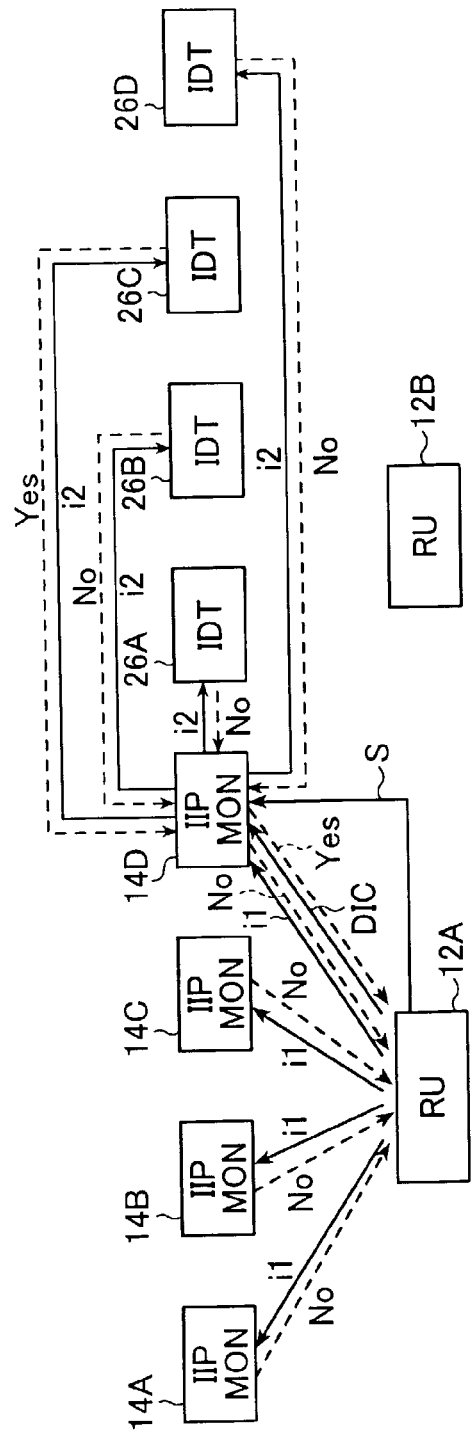
FIG. 3A
FIG. 3B

IMAGE INFORMATION PROCESSING SYSTEM

BACKGROUND OF THE INVENTION

1. Field of the Invention

The present invention relates to an image information processing system. In more detail, the present invention relates to an image information processing system in which there is unified a workflow from the registration of identification information (including subject information) of a sheet, on which an image of a subject such as a radiographic image of a patient has been recorded or is to be recorded, through the reception over a network of image information read from the sheet by an image information reading apparatus, to the confirmation, display, and output of an image. In particular, the present invention relates to an image information processing system in which an image information processing apparatus, which has an identification information registration function of registering identification information and an image confirmation function, and an identification information registration specialized terminal, which has only the identification information registration function and does not have the image confirmation function, coexist on a network on which there is provided an image information reading apparatus.

2. Related Background Art

Currently, there is used a radiographic image information recording and reproducing system that utilizes a stimulable phosphor that, when receiving the irradiation of radiation (X-rays, α-rays, β-rays, γ-rays, electron beams, ultraviolet rays, or the like), accumulates a part of radiation energy thereof and, on receiving the irradiation of excitation light (such as laser light or visible light) after that, exhibits stimulated light emission in accordance with the accumulated energy (see JP 55-12429 A, JP 56-11395 A, JP 56-11397 A, and the like).

As this radiographic image information recording and reproducing system, a radiographic image information processing system is proposed, for instance, in commonly assigned JP 63-253348 A, JP 01-227139 A, JP 04-123173 A, JP 04-155581 A, and the like and is put into actual use. The radiographic image information processing system includes: a radiographic image information reading apparatus that obtains image data by radiographing a patient at a hospital or the like using an X-ray radiographing apparatus or the like, temporarily accumulating and recording radiographic image information of the patient on a stimulable phosphor sheet, scanning the sheet with excitation light from a laser or the like to generate stimulated light emission, and photoelectrically reading the obtained stimulated light emission; an identification information registration apparatus that registers identification information of the patient; and a display apparatus that, for instance, displays the radiographic image as a visible image on the basis of the obtained image data so as to be associated with the registered identification information of the patient or the like on a display screen of an image recording apparatus, which records an image on a recording material such as photographic sensitive (photosensitive) material, a CRT display, or the like.

By the way, in a radiographic image information processing system like this, there may be a case where a radiographing apparatus for accumulating and recording a radiographic image on a stimulable phosphor sheet and a radiographic image information reading apparatus that reads radiographic image information from a sheet, on which a radiographic image has been accumulated and recorded, are constructed as separated apparatuses.

An example of a conventional radiographic image information processing system like this is shown in FIG. 6.

In a radiographic image information processing system (hereinafter also referred to as the "processing system") 100 shown in FIG. 6, before or when the patient is radiographed, first, an identification information registration apparatus (hereinafter also referred to as the "ID terminal") 102 placed in the proximity of a radiographic image taking apparatus or the like registers identification information (hereinafter referred to as the "ID information") including bar code information (identification information) of a stimulable phosphor sheet (hereinafter also simply referred to as the "sheet") on which an image has been radiographed, patient information such as the name, gender, birthday, and identification (ID) number of a patient, and radiographing information such as a radiographing date, a radiographed body part, and a radiographing method.

Next, processing conditions concerning the radiographic image information read by a radiographic image information reading apparatus (hereinafter also referred to as the "reading apparatus") 104, information specifying the outputting destination of the radiographic image information (delivery destination of image data), that is, information showing which image display apparatus (hereinafter also referred to as the "monitor") 106 should be used to confirm the image and which image recording apparatus (hereinafter also referred to as the "printer") 108 should be used to output the image, outputting conditions concerning the radiographic image information at the printer 108, and information specifying the delivery destination of the outputted radiographic image (developed X-ray film or the like) such as a department of a hospital like the department for internal disease or the department of surgery are transmitted from the ID terminal 102 to the reading apparatus 104 together with the registered ID information.

Next, the reading apparatus 104 reads a bar code on the underside of the sheet and associates this bar code with patient ID information obtained from the ID terminal 102. Also, when a cassette containing this sheet is inserted into the reading apparatus 104, this apparatus reads information concerning radiographed image from the sheet, performs processing (such as image processing) in accordance with obtained processing conditions as necessary, and obtains radiographic image information. The reading apparatus 104 then transmits the radiographic image information (image data) obtained in this manner to the monitor 106 specified as a delivery destination of the image data along with the ID information including outputting conditions and the like.

Next, the monitor 106 displays the received radiographic image information on a display screen as a visible image for image confirmation, also displays the ID information as necessary, and sends the received radiographic image information and the ID information to the printer 108 if the image is appropriate.

Following this, the printer 108 outputs the obtained radiographic image information as a hard copy image such as a transparent film image or a reflection paper image that is equivalent to an X-ray film image, on the basis of the outputting conditions contained in the ID information simultaneously obtained. The outputted radiographic image is delivered by a known means from the ID terminal 102 to a delivery destination obtained as the ID information.

Now, there is a case where in a hospital whose scale is large or medium, a plurality of radiographing rooms exist and a radiographing apparatus for taking a radiographic image is provided in each radiographing room. Also, in the conventional processing system disclosed in each document described above, the reading of a large number of stimulable phosphor sheets is performed with a single reading apparatus that is high-priced but has high throughput. In recent years, however, there has been made a shift to a decentralized system in which there are used a plurality of reading apparatuses each having low throughput but being relatively low-priced. Consequently, like a radiographic image information processing system 110 shown in FIG. 7, one or plural reading apparatuses 104 are connected to a plurality of ID terminals 102 in order to make it possible to place the ID terminals 102, for example, in the vicinity of the reception desk of a hospital, the reception desk of each department of the hospital, and the like as well as beside each radiographic image taking apparatus. In this manner, it becomes possible to easily and efficiently input information of a patient and check a stimulable phosphor sheet against patient information at the radiographing apparatus. Alternatively, it becomes possible to read a stimulable phosphor sheet registered at an arbitrary reading apparatus 104 without reference to which ID terminal 102 performed registration for the sheet. In this manner, it becomes possible to allow the plurality of reading apparatuses 104 to efficiently operate.

Even in the case where a plurality of radiographing apparatuses are provided in this processing system 110, however, the radiographic image information reading apparatus 104 for reading image information from a sheet, on which a radiographic image of a patient has been recorded, is still high-priced. Consequently, needless to say, the number of the radiographic image information reading apparatuses 104 is smaller than the number of the ID terminals 102. In addition, in general cases, the number of the radiographic image information reading apparatuses 104 is smaller than the number of radiographing apparatuses. Consequently, there is followed a procedure where identification information is registered at each ID terminal 102, each sheet, on which an image has been taken in a radiographing room (each radiographing apparatus), is brought to a nearest reading apparatus 104, the reading of image information is performed with the reading apparatus 104, a visible image of the read image information is displayed on a monitor 106 (106*a*) attached to this reading apparatus 104 or a centrally controlled monitor 106 (106*b*), and the state of the displayed image is confirmed. That is, conventionally, identification information of a plurality of sheets, on which images have been recorded using a plurality of radiographing apparatuses, is registered at a plurality of ID terminals 102, although the confirmation of images recorded on the plurality of sheets with the plurality of radiographing apparatuses is performed using a single monitor 106.

In the conventional processing system 110 shown in FIG. 7, however, if the confirmation of images taken with a plurality of radiographing apparatuses is performed using a single monitor 106 in this manner, this results in a situation where images taken by the plurality of radiographing apparatuses (radiographing rooms) coexist on the single monitor 106, so that there may be created confusion over correspondences between images and radiographing rooms that took the images. Further, in the case where different radiographing technicians are deployed for respective radiographing rooms, there may be created confusion over which radiographing technician should be responsible for an image. In particular, in the case where images read with a plurality of reading apparatuses 104 are confirmed using the centrally controlled monitor 106*b*, there is a possibility of creating further confusion for an operator or user of this system.

In view of these problems, commonly assigned Japanese Patent Application No. 2000-356160 proposed, as an image information processing system that allows images taken with a plurality of radiographing apparatuses to be confirmed without confusion, an image information (data) automatic delivery system in which a plurality of units, each of which includes an information registration terminal (ID terminal) and a corresponding monitor (image display apparatus) for image confirmation, and an image information (data) reading apparatus are provided on a network.

This image information processing system is shown in FIG. 8. In the image information processing system 120 shown in FIG. 8, each ID terminal 122 corresponds to one monitor 124 in a one-to-one relationship and constitutes one unit 126 with the monitor 124.

First, ID information concerning a patient and a stimulable phosphor sheet is registered with the information registration terminal 122*a* of one unit 126*a* of a plurality of units 126.

On the other hand, image information and ID information of the sheet having this ID information are read by one reading apparatus 104*a* of a plurality of image information reading apparatuses 104. Next, this reading apparatus 104*a* inquires of each ID terminal 122 of the plurality of units 126 where the registration destination of the read ID information is. As a result, in the illustrated example, the ID terminal 122*a* of the unit 126*a* returns a response showing that the registration target is the ID terminal 122*a* to the reading apparatus 104*a*.

Following this, the reading apparatus 104*a* automatically delivers (sends) the read image information and ID information to a monitor 124*a* that corresponds to the ID terminal 122*a* of the unit 126*a* in a one-to-one relation.

The monitor 124*a* displays image information received from the reading apparatus 104*a* on a display screen (ID information is also displayed as necessary) and image confirmation is performed.

After the image confirmation, the image information and ID information are sent from the monitor 124*a* to an image recording apparatus (printer) 108 and are outputted on a recording medium such as an X-ray film, by the printer 108 as a hard copy image.

In this processing system 120, it is possible to confirm image information (data) using a monitor 124 corresponding to the ID terminal 122 that has registered identification information of a sheet, that is, a monitor 124 corresponding to each radiographing apparatus. As a result, there is achieved an effect of preventing confusion which is caused during work by a situation where images taken with a plurality of radiographing apparatuses are jumbled together, which ensures improvement of radiographing technician's convenience, operator's convenience, or user's convenience.

However, there are many cases where a hospital or the like that wishes to introduce the processing system 120 shown in FIG. 8 in order to obtain the effect described above has already introduced the processing system 100 or 110 shown in FIG. 6 or 7, so that it is required to integrate these processing systems. However, even if these processing systems are integrated with each other, there occurs a problem that the delivery destination to which a radiographic image read by a reading apparatus should be delivered for the image confirmation of the radiographic image, should be changed depending on which system is used. That is, as shown in FIG. 5B, the ID terminal 102 used in the processing systems 100 and 110 shown in FIGS. 6 and 7 does not include an image display monitor corresponding to the ID terminal in a one-to-one relationship and therefore is an ID information registration specialized ID terminal with which it is impossible to perform image confirmation. Consequently, read image information is delivered from the reading apparatus 104 to a monitor 106, which is completely different from the ID terminal 102 that registered identification information, and the image confirmation is performed using this monitor 106. In contrast to this, the ID terminal 122 used in the processing system 120 shown in FIG. 8 includes a monitor 124 within the same unit 126, so that the read image information is necessarily delivered from the reading apparatus 104 to this monitor 124 and the image confirmation is performed using this monitor 124.

Consequently, as shown in FIG. 5B, in a processing system in which the registration specialized ID terminal 102 coexists with the ID terminal 122 having the monitor 124 within the same unit 126, the delivery destination of read image information should be changed. This means that a radiographing technician, system user, system operator, or the like performs image confirmation at different places. As a result, there occurs a problem in that there exist two workflows; the processing is complicated; and there is created confusion.

SUMMARY OF THE INVENTION

An object of the present invention is to solve the problems of the background art described above by providing an image information processing system in which even if an image information processing apparatus, which includes an identification information registration function of registering identification information (including subject information) of sheet on which an image has been recorded or is to be recorded, and a function of confirming an image received from an image information reading apparatus, and an identification information registration specialized terminal, which has only an identification information registering function and does not have an image confirmation function, coexist on a network having the image information reading apparatus that reads image information from a sheet on which there has been recorded an image of a subject such as a radiographic image of a patient, it is possible to unify the delivery destination of the read image information and to unify a place at which a system user, a system operator, or a radiographing technician confirms the image, thereby making it possible to unify a workflow from the registration of identification information of a sheet, through the reception of the read image information over a network, to the confirmation, display, and output of an image.

In order to attain the object described above, the present invention provides an image information processing system comprising at least one image information processing apparatus having an identification information registration function of registering identification information of a sheet, which is to be used when an image of a subject is taken and recorded, and an image confirmation function, at least one identification information registration specialized apparatus that performs only registration of the identification information and does not have the image confirmation function, at least one image information reading apparatus in which the sheet, on which the image has been taken and recorded, is loaded and which reads image information of the image from the loaded sheet, and means for establishing network-connection among at least one image information processing apparatus, at least one identification information registration specialized apparatus, and at least one image information reading apparatus, wherein one image information processing apparatus among at least one image information processing apparatus automatically receives, from one image information reading apparatus among at least one image information reading apparatus, the image information read by one image information reading apparatus from the sheet having the identification information registered using the identification registration function of one image information processing apparatus, and performs image confirmation using its own image confirmation function, and if the image information is read by one image information reading apparatus from the sheet having the identification information registered by one identification information registration specialized apparatus among at least one identification information registration specialized apparatus, the image information processing apparatus confirms which identification information registration specialized apparatus registered the identification information, internally registers the identification information using its own identification information registration function, automatically receives the image information from one image information reading apparatus, and performs the image confirmation using its own image confirmation function.

Preferably, one image information reading apparatus reads, from the loaded sheet, the identification information given to the sheet, inquires of at least one image information processing apparatus whether it registered the identification information, receives, from an image information processing apparatus that registered the identification information, a response showing that it registered the identification information, and delivers the image information to the image information processing apparatus, if no image processing apparatus returns the response for the inquiry showing that it registered the identification information, the image information reading apparatus causes a predetermined image information processing apparatus among at least one image information processing apparatus to inquire of at least one identification information registration specialized apparatus whether it registered the identification information, on receiving, from the identification information registration specialized apparatus registered the identification information, the response showing that it registered the identification information, the predetermined image information processing apparatus internally registers the identification information using its own identification information registration function, and returns the response showing that it registered the identification information to one image information reading apparatus, and one image information reading apparatus delivers the image information to the predetermined image information processing apparatus that returned the response showing that it registered the identification information.

Preferably, one image information reading apparatus reads, from the loaded sheet, the identification information given to the sheet, inquires of a predetermined image information processing apparatus among at least one image information processing apparatus which image information processing apparatus registered the identification information, receives a response from the predetermined image information processing apparatus, and delivers the image information to an image information processing apparatus that registered the identification information, wherein if the predetermined image information processing apparatus registered the identification information, the predetermined image information processing apparatus returns a response showing that it registered the identification information to one image information reading apparatus, if the predetermined image information processing apparatus did not register the identification information, the predetermined image information processing apparatus inquires of each of other image information processing apparatuses whether it registered the identification information, receives a response from an image information processing apparatus that registered the identification information, returns a response showing which image information processing apparatus registered the identification information to one image information reading apparatus, and if there is not returned, from any image information processing apparatus, the response showing that it registered the identification information, the predetermined image information processing apparatus inquires of at least one identification information registration specialized apparatus whether it registered the identification information, receives, from an identification information registration specialized apparatus that registered the identification information, the response showing that it registered the identification information, internally registers the identification information using its own identification information registration function, and returns a response showing that the predetermined image information processing apparatus registered the identification information to one image information reading apparatus.

Further, preferably, the image information processing apparatus and the identification information registration specialized apparatus register information concerning the subject and the image thereof in addition to identification information of the sheet, on which the image of the subject is to be recorded, so as to be associated with each other, and during the internal registration of the identification information, the image information processing apparatus receives the information concerning the subject and the image thereof associated with the identification information from an identification information registration specialized apparatus that registered the identification information.

BRIEF DESCRIPTION OF THE DRAWINGS

In the accompanying drawings:

FIGS. 3A and 3B are each a drawing illustrating an example of a method of delivering image information in the image information processing system shown in FIG. 2B;

DETAILED DESCRIPTION OF THE PREFERRED EMBODIMENTS

An image information processing system according to the present invention will be described in detail below based on preferred embodiments shown in the accompanying drawings.

Figure 1:
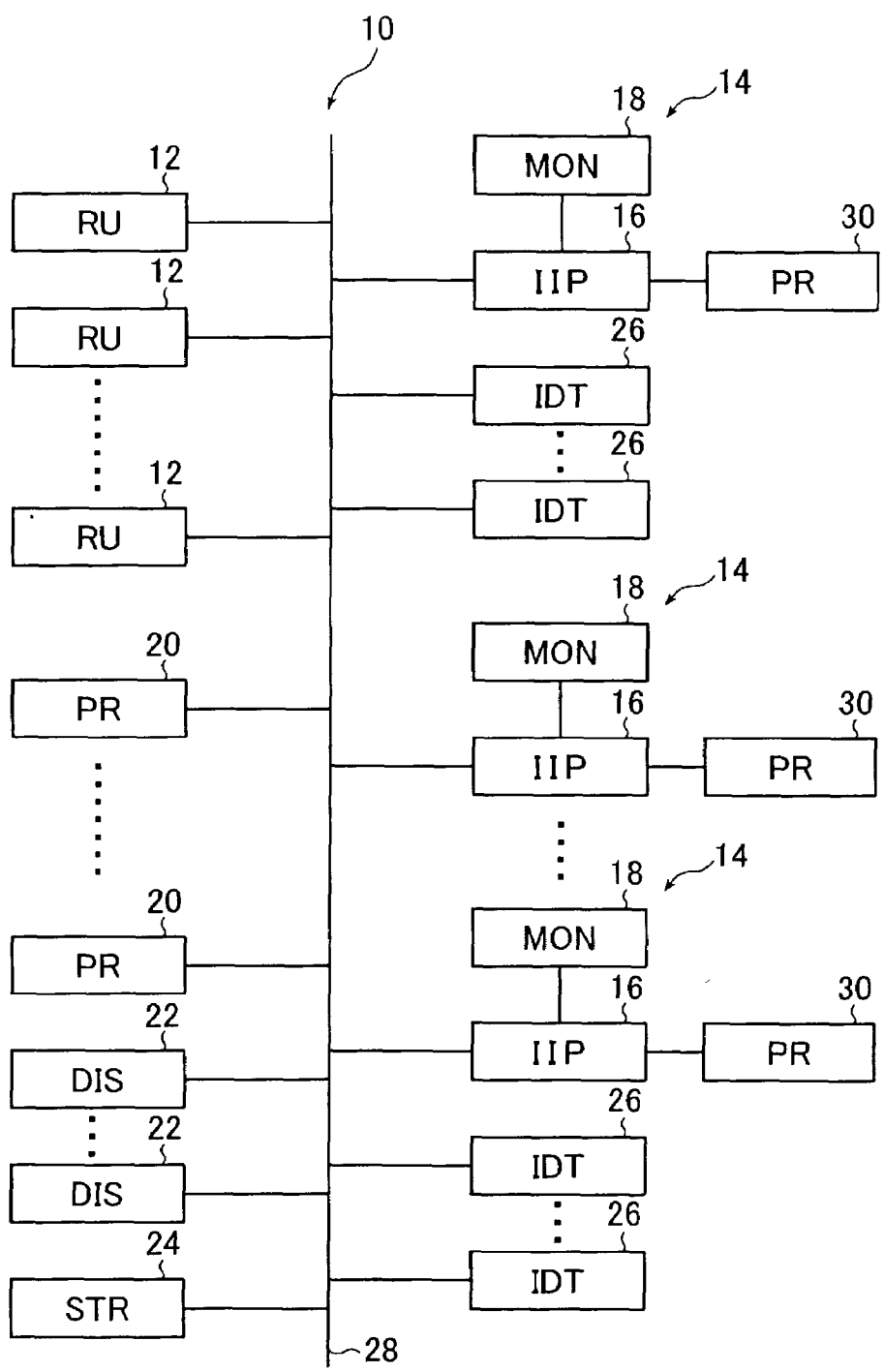
FIG. 1 is a block diagram showing the outline of an embodiment of an image information processing system according to the present invention.

FIG. 1 is a block diagram showing the outline of an embodiment of the image information processing system according to the present invention.

In the following description, as a representative example of the image information processing system, there will be explained a CR (Computed Radiography) system in which a radiographic image of a patient or the like is recorded on a stimulable phosphor sheet (hereinafter simply referred to as the "sheet"), this sheet is scanned using excitation light, an image signal (image data) is obtained by reading stimulated light emission from the sheet described above by this scanning through photoelectric conversion, and this image signal is outputted to an X-ray film or is displayed on a medical diagnostic image browsing apparatus as a visible image.

As shown in FIG. 1, an image information processing system (hereinafter simply referred to as the "processing system") 10 of the present invention includes a plurality of radiographic image reading apparatuses RU (hereinafter simply referred to as the "reading apparatuses") 12, a plurality of image information processing apparatuses (hereinafter simply referred to as the "processing apparatuses") 14 that each includes an image information processing apparatus main body IIP (hereinafter simply referred to as the "processing apparatus main body") 16 and an image display apparatus MON (hereinafter referred to as the "monitor") 18, a plurality of image recording apparatuses PR (hereinafter simply referred to as the "printers") 20, a plurality of medical diagnostic image browsing apparatuses DIS (hereinafter referred to as the "browsing apparatuses") 22, an image storing apparatus STR 24, a plurality of identification information registration specialized apparatuses IDT (hereinafter referred to as the "ID terminals") 26, and a network connecting means (hereinafter simply referred to as the "network") 28. Here, the network 28 establishes network-connection among the plurality of reading apparatuses 12, the plurality of processing apparatuses 14, the plurality of printers 20, the plurality of browsing apparatuses 22, the image storing apparatus 24, and the plurality of ID terminals 26.

In the processing system 10 of the present invention, the reading apparatus 12 is an apparatus that irradiates excitation light onto a sheet on which a predetermined body part of a patient has been radiographed at a radiographing apparatus (32A or the like, see FIG. 2A) such as an X-ray radiographing apparatus, and photoelectrically reads the accumulated and recorded radiographic image of the patient as image data, as described in aforementioned JP 63-253348 A, JP 04-155581 A, and the like. In the illustrated example, the plurality of reading apparatuses 12 are connected to the processing apparatus 14 over the network 28.

It should be noted here that when a predetermined body part of a patient is radiographed at the radiographing apparatus (32A or the like), identification information (ID information) such as an identification number of a sheet is read from a bar code recorded on the underside of a stimulable phosphor sheet and is associated with identification (ID) information such as an identification (ID) number of the patient. Consequently, when a radiographic image of the patient is read from the stimulable phosphor sheet at the reading apparatus 12, it is possible to read the ID information of the sheet from the bar code on the underside of the stimulable phosphor sheet in a like manner and to confirm the identification information such as the patient ID number associated at the radiographing apparatus.

Therefore, the reading apparatus 12 inquires of each of the plurality of processing apparatuses 14 whether it registered the ID information using the ID information read from the sheet. The reading apparatus 12 then transmits over the network 28 the read radiographic image to the processing apparatus 14 that returned a response showing that it registered or internally registered the ID information.

Also, in the processing system 10 in the illustrated example, the plurality of reading apparatuses 12 are connected to the network 28, but the present invention is not limited to this and only one reading apparatus 12 may be connected to the network 28.

The processing apparatus 14 includes the processing apparatus main body 16, the monitor 18 that is directly connected to this main body, a printer 30 that is further directly connected as necessary, and an external storage apparatus (not shown). The processing apparatus main body 16 includes: a function as a so-called ID terminal for inputting the ID information of a sheet and ID information including patient information, radiographing information, and the like associated with the sheet ID information; a function of receiving, from the ID terminal 26, ID information registered at the ID terminal 26 that does not have an image confirmation function and is not provided with a confirmation image display monitor, and internally registering the received ID information as information that was registered by the processing apparatus main body 16; a function of receiving a radiographic image read by the reading apparatus 12; and a function of having a monitor 18 that is directly connected display the radiographic image received from the reading apparatus 12.

Here, in the processing apparatus main body 16, by a radiographing technician, an operator, a user, or the like (the following description will be made by taking a case of the operator as a representative), there are inputted and registered ID information (such as bar code information (ID information) of a stimulable phosphor sheet on which an image has been recorded or is to be recorded), patient information (such as the name, gender, birthday, and ID number of a patient), radiographing information (such as a radiographing date, radiographed body part, and radiographing method), and the like. However, for instance, there may also be inputted and registered information concerning the delivery destination of the radiographic image, image processing conditions, and the like.

Also, the processing apparatus main body 16 may have a function of subjecting the radiographic image received from the reading apparatus 12 to appropriate image processing, a function of outputting the radiographic image to the printer 30 that is directly connected or delivering the radiographic image to a delivery destination that is at least one of the plurality of printers 20, the plurality of browsing apparatuses 22, and the image storing apparatus 24 on the network 28, a function of reading appropriate patient information from the ID information stored in the external storage apparatus, and the like.

The monitor 18 is used to perform image confirmation where the radiographic image and ID information received from the reading apparatus 12 are displayed together or are displayed so as to be associated with each other, and it is confirmed whether the displayed image is correct and is also appropriate as an image by checking the ID information, that is, by checking the ID number of the sheet as well as the patient information and radiographing information associated with the sheet ID number. During this operation, the monitor 18 may display, for confirmation, ID information that was inputted and registered at the processing apparatus main body 16 by a radiographing technician, an operator, a user, or the like (the following description will be made by taking a case of the operator as a representative). No specific limitation is imposed on the monitor 18 used in the present invention and it is possible to use any known display apparatus, such as a CRT display apparatus, an LCD display apparatus, or a plasma display apparatus. However, in the case where the monitor 18 is used to display a medical diagnostic image, it is preferable that there is used a display apparatus with performance that is equivalent to the image browsing apparatus 22 to be described later.

The printer 20 is one kind of an image outputting apparatus that outputs a hard copy image using an image data signal of a radiographic image received from the processing apparatus 14 (processing apparatus main body 16) over the network 28. In the hard copy image, the radiographic image to be applied to medical diagnosis is associated with the ID information of a patient or is recorded along with a part of the ID information. For instance, the printer 20 records and outputs the radiographic image on a photographic sensitive material (photosensitive film) so as to be associated with the ID information of a patient or along with a part of the ID information. The plurality of printers 20 are connected to the processing apparatus 14 over the network 28 in the illustrated example, but the present invention is not limited to this and there occurs no problem so long as at least one printer 20 is connected.

Like the printer 20, the printer 30 records a radiographic image subjected to image processing as a visible image on a recording material such as a photographic sensitive material (photosensitive film), so as to be associated with patient ID information or the like using the image data signal of the radiographic image that is directly outputted from the processing apparatus main body 16 of the processing apparatus 14. Note that there occurs no problem even if the printer 30 is not provided.

No specific limitation is imposed on the printer used in the present invention, but it is preferable that there is used a printer that is capable of recording and outputting an image as a hard copy image whose performance is equivalent to an X-ray film image to be applied to medical diagnosis. As a representative example of a printer like this, there is cited a printer that records a latent image by scanning and exposing a photographic sensitive material (photosensitive film) using a modulation light beam such as a laser beam modulated in accordance with an image data signal of a radiographic image received from the processing apparatus 14, develops the exposed photosensitive material through development processing, and outputs the radiographic image as a hard copy image. There is also cited a printer that records and outputs an image on a heat-sensitive material (heat-sensitive film) using a heat-sensitive recording head (thermal head) modulated in accordance with an image data signal of a radiographic image or using a heat mode laser modulated in a like manner.

It should be noted here that no specific limitation is imposed on the photosensitive material or heat-sensitive material used in the present invention, but it is preferable that there is used a photosensitive film or a heat-sensitive film. Also, examples of such material include known photosensitive materials and heat-sensitive materials such as a silver salt photographic sensitive material, a photosensitive thermal developing material, and various kinds of heat-sensitive materials that are capable of wet processing or dry processing.

Further, in addition, as the printer in the present invention, there may be used a known image recording apparatus such as an electrophotographic image recording apparatus that transfers an image onto an image receiving material using a photosensitive body and toner or an image recording apparatus using a method with which an image is transferred onto an image receiving material through sublimation.

The browsing apparatus 22 is an image outputting apparatus that displays a radiographic image to be applied to medical diagnosis on a display screen as a soft copy image using an image data signal of a radiographic image received from the processing apparatus 14 over the network 28, with the radiographic image being displayed so as to be associated with the ID information of the patient or being displayed along with a part of the ID information. The plurality of browsing apparatuses 22 are connected to the processing apparatus 14 over the network 28 in the illustrated example, but the present invention is not limited to this and there occurs no problem even if no browsing apparatus is connected or only one browsing apparatus 22 is connected. Note that it is preferable that the image outputting apparatus of the present processing system 10 includes both of the printer 20 and the browsing apparatus 22, but there occurs no problem even if the image outputting apparatus includes only either one of them.

No specific limitation is imposed on the browsing apparatus 22 used in the present invention so long as the apparatus is capable of displaying an image for medical diagnosis. That is, it is possible to use any known display apparatus such as a CRT display apparatus, an LCD display apparatus, a plasma display apparatus, or an EL panel. This browsing apparatus 22 is used to display a medical diagnostic image, so that it is preferable that the browsing apparatus is high in brightness to make it possible to maintain a wide display density dynamic range, is capable of performing high definition display, and has a wide viewing angle to allow inspectors including a plurality of doctors and inspection technicians to simultaneously browse an image. In particular, in the case where an LCD whose viewing angle is narrow is used as the browsing apparatus 22 of the present invention, it is preferable that there is used a display apparatus with a viewing angle widening mechanism.

The image storing apparatus (hereinafter simply referred to as the "storing apparatus") 24 is one kind of an image outputting apparatus that stores and preserves an image data signal of a radiographic image received from the processing apparatus 14 over the network 28 for a long time period as a database of radiographic images, with the image data signal being associated with ID information in the database. Here, the storing apparatus 24 functions as a database of radiographic images and it is preferable that this storing apparatus is provided as one kind of an image outputting apparatus of the present processing system 10, but the database of radiographic images may not be provided if it is not required to provide such a database. No specific limitation is imposed on the capacity of the storing apparatus 24 (database capacity) and there occurs no problem so long as the capacity is appropriately selected in accordance with the scale of the present processing system 10.

The ID terminal (IDT) 26 includes a keyboard and a mouse for inputting ID information and a monitor for confirming the ID information, and is a terminal for inputting and confirming bar code information (ID) of a sheet and other ID information such as patient information and radiographing information. Consequently, the ID terminal 26 does not include an image confirmation function and is not provided with a confirmation image display monitor, and is used to input ID information in place of the processing apparatus 14 (processing apparatus main body 16) of the present processing system 10.

In the illustrated example, a plurality of ID terminals 26 are connected to the processing apparatus 14 over the network 28, but the present invention is not limited to this and there occurs no problem so long as at least one ID terminal 26 is connected. In the present processing system 10, this ID terminal 26 is placed at a radiographing apparatus, the reception desk of a hospital, the reception desk of each medical department of the hospital, the reading apparatus 12, the printers 20 and 30, the browsing apparatus 22, and the storing apparatus 24. As a result, it becomes possible to easily perform the input, retrieval, checking, and confirmation of the ID information.

As described above, the network connecting means 28 is used to establish network-connection among the plurality of processing apparatuses 14, the plurality of reading apparatuses 12, the plurality of printers 20, the plurality of browsing apparatuses, the storing apparatus 24, and the plurality of ID terminals 26, and is a communication network such as a LAN or VAN constructed inside of a hospital or the like. No specific limitation is imposed on this network 28 and there may be used any kind of communication network. Also, at least one X-ray radiographing apparatus or radiographing platform (not shown) may be connected to this network 28.

The image information processing system 10 in the illustrated example is fundamentally constructed in the manner described above.

Next, how the image information processing system of the present invention operates will be described in detail with reference to FIGS. 2A to 4B by taking, as a representative example, a case where the image information processing system of the present invention is applied to a CR system used within the premises of a hospital.

Figures 2A, 2B:
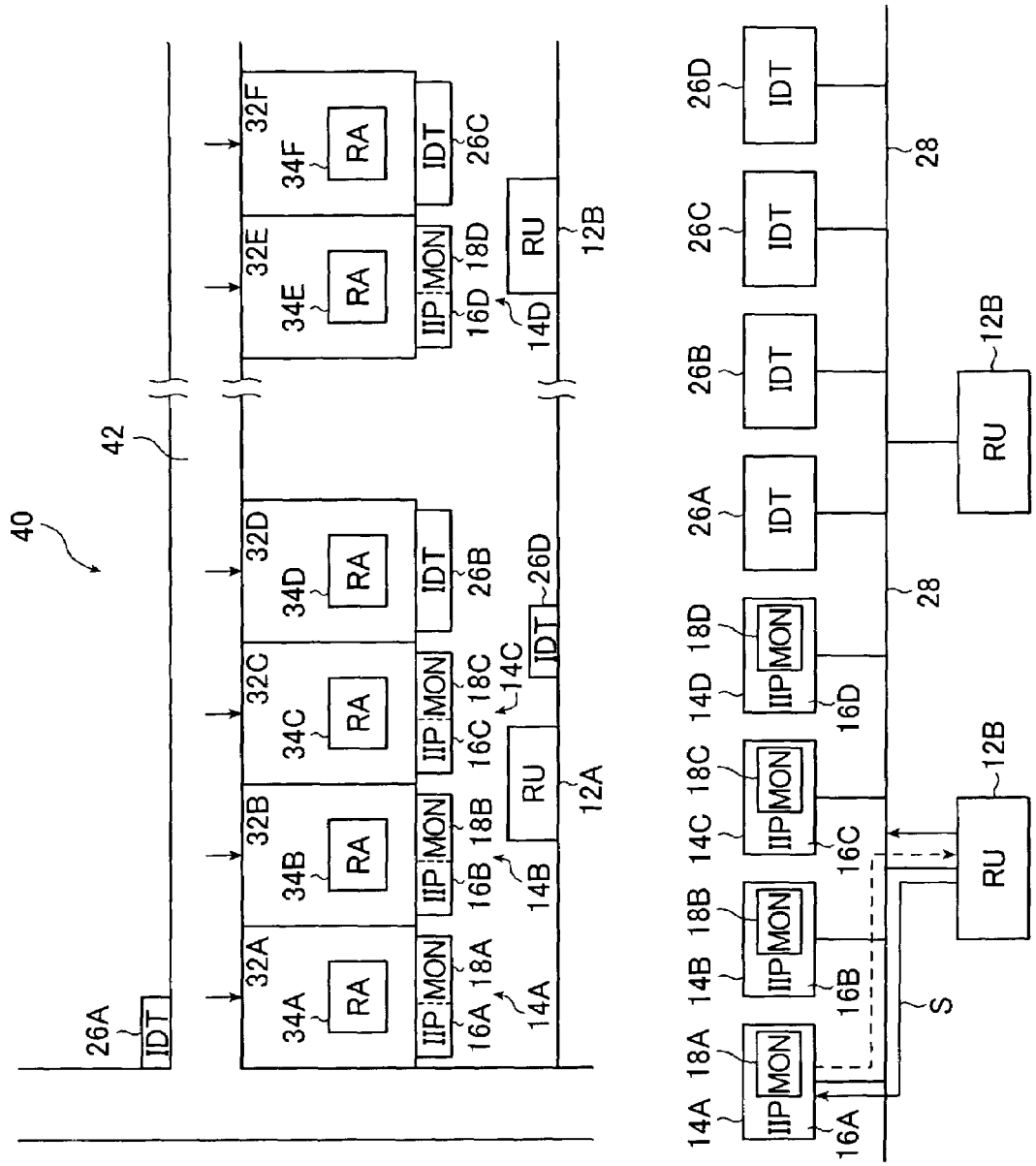
FIG. 2A is a layout drawing of an embodiment in which the image information processing system of the present invention shown in FIG. 1 is applied to a CR system used within hospital premises.
FIG. 2B shows the construction of the image information processing system of the present invention applied to the CR system shown in FIG. 2A.

FIG. 2A is a layout drawing of an example of the CR system to which the image information processing system of the present invention shown in FIG. 1 is applied and which is used in the hospital premises. FIG. 2B shows the construction of the image information processing system of the present invention applied to the CR system shown in FIG. 2A. FIGS. 3A to 4B are each a drawing illustrating an example of a method of delivering image information in the image information processing system of the present invention.

It should be noted here that each of FIGS. 2A to 4B relates to an example where six radiographing rooms exist within the hospital premises and the image information processing system of the present invention is applied to a CR system including six X-ray radiographing apparatuses, two radiographic image reading apparatuses, four image processing apparatuses, and four identification information registration specialized apparatuses, but the present invention is not limited to this.

As shown in FIG. 2A, for instance, within the hospital premises 40, four radiographing rooms 32A to 32D are arranged so as to face a corridor 42, two radiographing rooms 32E to 32F are arranged so as to face the corridor 42 in a like manner at positions separated from the radiographing rooms 32A to 32D, and the radiographing apparatuses (RA) 34A to 34F are provided in the radiographing rooms 32A to 32F, respectively. Each of the radiographing apparatuses 34A to 34F is an apparatus that accumulates and records a radiographic image of a subject (predetermined body part of a patient, in this example) on a stimulable phosphor sheet.

Also, in each of the radiographing rooms 32A to 32C and 32E, there are provided one of processing apparatus main bodies 16A to 16C and 16D that each register a bar code that is sheet identification (ID) information given to each stimulable phosphor sheet, patient information, and radiographing information so as to be associated with each other, and one of monitors 18A to 18C and 18D used to perform image confirmation. Here, each monitor 18A to 18D corresponds to one of the processing apparatus main bodies 16A to 16D in a one-to-one relationship and each set of a monitor and a processing apparatus main body constitutes one of the processing apparatuses 14A to 14D as one paired unit. However, each of the monitors 18A to 18D may be provided as a body separated from each of the processing apparatus main bodies 16A to 16D or may be a monitor attached to each of the processing apparatus main bodies 16A to 16D. In this example, each of the monitors 18A to 18D is a monitor attached to one of the processing apparatus main bodies 16A to 16D and both of them integrally constitute one of the processing apparatuses 14A to 14D.

On the other hand, an ID terminal 26A that is not capable of performing image confirmation but registers the ID information of a sheet, patient information, and radiographing information so as to be associated with each other is placed at a reception desk on a side opposite to the radiographing room 32A with the corridor 42 therebetween, the ID terminals 26B and 26C are respectively placed in the radiographing rooms 32D and 32F, and an ID terminal 26D is placed in the proximity of the reading apparatus 12A.

Also, a reading apparatus 12A and a reading apparatus 12B are provided outside of the radiographing rooms 32A to 32D and the radiographing rooms 32E to 32F on an opposite side of the corridor 42, respectively. A stimulable phosphor sheet, on which a radiographic image has been recorded at each radiographing apparatus 34A to 34F, is loaded in one of these reading apparatuses 12A and 12B, which then scans this sheet using excitation light and reads stimulated light emission from the sheet by this scanning through photoelectric conversion, thereby obtaining image information (data).

In the CR system shown in FIG. 2A constructed in this manner, four processing apparatuses 14A to 14D that each include one of four processing apparatus main bodies 16A to 16D and one of four monitors 18A to 18D as a pair, four ID terminals 26A to 26D, and two reading apparatuses 12A and 12B are connected to each other over the network 28, as shown in FIG. 2B, and constitute the image information processing system of the present invention.

It should be noted here that although not illustrated in this example, image outputting apparatuses (such as the printers 20 and 30, the browsing apparatus 22, and the storing apparatus 24), an image processing apparatus, and the like are provided on the network 28, as shown in FIG. 1. Also, image information obtained at the reading apparatuses 12A and 12B is delivered to the image outputting apparatuses and the image processing apparatus as appropriate.

Next, there will be described processing performed in an embodiment of the processing system shown in FIG. 2B.

A patient enters into a specified radiographing room along an arrow in FIG. 2A. On the other hand, a radiographing technician registers patient information K of the patient that is to be a subject (including radiographing information) and ID information I, such as the ID number of a stimulable phosphor sheet on which a radiographic image of this patient is to be recorded, at a processing apparatus (processing apparatus main body) or an ID terminal. In this embodiment, it is assumed that the radiographing is performed at the radiographing apparatus 34A in the first radiographing room 32A and therefore the patient information K and the sheet ID information I are registered at the processing apparatus 14A (processing apparatus main body 16A) provided so as to correspond to the radiographing apparatus 34A. The registration of the patient information K may be performed through a key input operation or be performed by reading an ID card or the like of the patient. Also, the registration of the sheet ID information I is performed by reading a bar code given to the sheet. Both of these information K and I are registered so as to be associated with each other and resultant information (K-I) is transmitted to the image information reading apparatuses 12A and 12B.

A stimulable phosphor sheet is set in the radiographing apparatus 34A and a radiographic image of the patient is recorded thereon. Note that the order in which the ID information registration and the image radiographing described above are performed may be reversed and, after the image radiographing is performed, the ID information of a sheet on which this image has been recorded and patient information may be registered at an ID terminal. Also, radiographing conditions such as a body part to be radiographed may be registered concurrently with the patient information.

After the radiographic image is taken, the radiographing technician extracts the stimulable phosphor sheet from the radiographing apparatus 34A and loads this sheet in an image information reading apparatus. In this embodiment, it is assumed that the sheet is loaded in the reading apparatus 12A. The sheet may be loaded in the reading apparatus 12A while being contained in a cassette.

In the reading apparatus 12A, there is performed the reading of image information S that bears the image accumulated and recorded on the stimulable phosphor sheet. During this operation, the reading apparatus 12A reads a bar code given to the stimulable phosphor sheet, thereby recognizing the ID information I of the sheet. With reference to the sheet ID information I and the patient information K transmitted from the processing apparatus 14A in advance, image information S and patient information K obtained from the sheet subjected to image reading are stored so as to be linked to each other.

As shown in FIG. 3A, the reading apparatus 12A inquires of each of the processing apparatuses 14A to 14D whether it registered this ID information I (issues an inquiry i1), in order to deliver the image information S to the processing apparatus 14A that registered the read ID information I.

On receiving the inquiry i1 from the reading apparatus 12A, each of the processing apparatuses 14A to 14D transmits, to the reading apparatus 12A, a response showing whether it registered the ID information I.

The reading apparatus 12A receives the response from each of the processing apparatuses 14A to 14D. In this example, like in the embodiment shown in FIG. 2B, it is assumed that the reading apparatus 12A receives, from the processing apparatus 14A, a response (Yes) showing that it registered the ID information, and receives, from each of other processing apparatuses 14B, 14C, and 14D, a response (No) showing that it did not register the ID information. Consequently, the reading apparatus 12A recognizes that the ID information I was registered at the processing apparatus 14A and delivers the image information S to this processing apparatus 14A (processing apparatus main body 16A and monitor 18A).

When the processing apparatus 14A receives the image information S from the reading apparatus 12A, a visible image of the image information S is displayed by the monitor 18A and the radiographing technician confirms the displayed image. That is, it is possible for the radiographing technician to confirm the image borne by the image information S using the monitor 18A of the processing apparatus 14A placed so as to correspond to the radiographing apparatus 34A that took the radiographic image borne by the image information S.

On the other hand, as shown in FIG. 3B, in the case where the reading apparatus 12A receives, from each of the processing apparatuses 14A to 14D, a response (No) showing that it did not register the ID information, the reading apparatus 12A issues, to a preset processing apparatus (the processing apparatus 14D in this example), a notification that none of the processing apparatuses registered the ID information I and an instruction DIC to inquire of each of the ID terminals 26A to 26D.

On receiving such an instruction DIC from the reading apparatus 12A, the processing apparatus 14D inquires of each of the ID terminals 26A to 26D whether it registered this ID information I (issues an inquiry i2).

On receiving the inquiry i2 from the processing apparatus 14D, each ID terminal 26A to 26D transmits a response showing whether it registered the ID information to the processing apparatus 14D.

The processing apparatus 14D receives the response from each of the ID terminals 26A to 26D. In this example, it is assumed that the reading apparatus receives, from the ID terminal 26C, a response (Yes) showing that it registered the ID information, and receives, from each of other ID terminals 26A, 26B, and 26D, a response (No) showing that it did not register the ID information. Therefore, the processing apparatus 14D recognizes that the ID information I was registered at the ID terminal 26C and re-registers this ID information as ID information registered by itself using its internal registration function. During this operation, as necessary, the processing apparatus 14D may receive the patient information K and the radiographing information registered so as to be associated with the ID information I from the ID terminal 26C and internally register the received patient information K, radiographing information, and the like so as to be associated with the internally registered ID information I.

After the internal registration of the ID information I, the processing apparatus 14D returns a response (Yes) showing that it registered the ID information I to the reading apparatus 12A again.

Following this, the reading apparatus 12A recognizes that the ID information I was registered at the processing apparatus 14D and delivers the image information S to this processing apparatus 14D (processing apparatus main body 16D and monitor 18D).

When the processing apparatus 14D receives the image information S from the reading apparatus 12A, a visible image of the image information S is displayed by the monitor 18D and the radiographing technician confirms the displayed image. That is, even in the case where the radiographing apparatus 34F took the radiographic image borne by the image information S and the ID terminal 26C placed so as to correspond to this radiographing apparatus 34F does not have an image confirmation monitor and is not provided with an image confirmation function, for instance, it is possible for the radiographing technician to easily confirm the image borne by the image information S at the monitor 18D of the nearby processing apparatus 14D.

In the case where the radiographing technician has judged that an image is normally obtained as a result of the image confirmation, the processing apparatus 14A (see FIG. 3A) or 14D (see FIG. 3B) performs image processing on the image information S received from the reading apparatus 12A as necessary, and then transmits the image information S along with the ID information which includes the patient information K and the radiographing information, as an information set, to an image outputting apparatus such as the printer 30, the printer 20 placed on the network 28, the browsing apparatus 22, or the image storing apparatus 24. Note that in the case where a normal image is not obtained, there is taken a measure where, for instance, image radiographing is performed again.

It should be noted here that in the embodiment described above, there has been used a form where the reading apparatus 12A inquires of each of the processing apparatuses 14A to 14D whether it registered the ID information I read from a sheet. However, there may be used a form where the reading apparatus 12A inquires of a predetermined processing apparatus and this predetermined processing apparatus further inquires of other processing apparatuses.

Figure 4A:
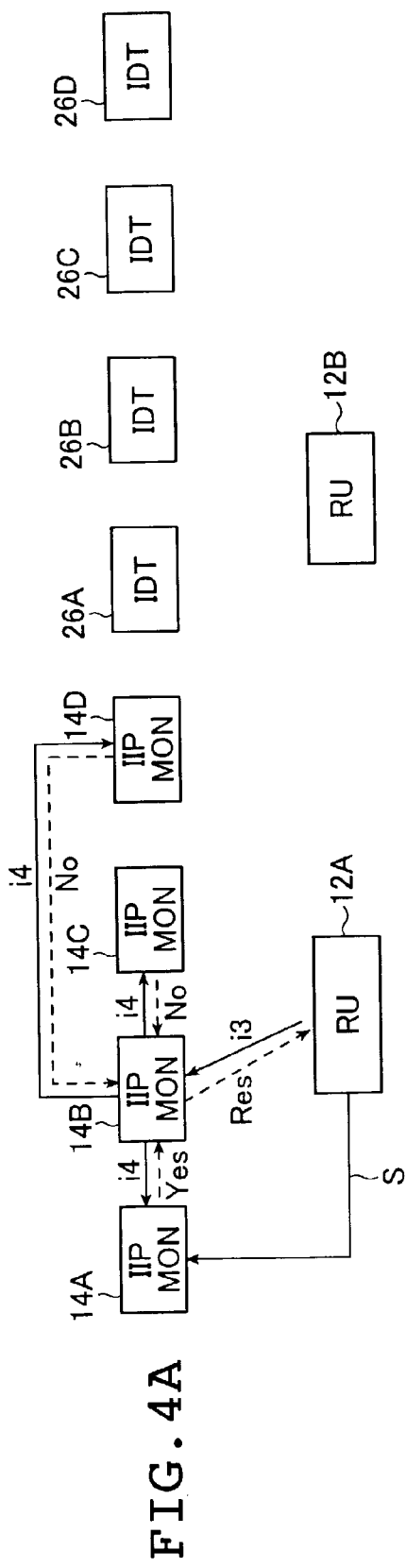
FIGS. 4A and 4B are each a drawing illustrating another example of the method of delivering image information in the image information processing system shown in FIG. 2B.

In more detail, as shown in FIG. 4A, first, setting is made so that the reading apparatus 12A inquires of a predetermined processing apparatus 14B at all times. The reading apparatus 12A inquires (issues an inquiry i3) of the processing apparatus 14B which one of the processing apparatuses registered the ID information I of a sheet from which the image information S has been read.

If the processing apparatus 14B registered the ID information I, this apparatus returns a response showing that it registered the ID information to the reading apparatus 12A. If the processing apparatus 14B did not register the ID information I, this apparatus inquires of each of other processing apparatuses 14A, 14C, and 14D whether it registered the ID information I (issues an inquiry i4).

On receiving the inquiry i3, each of the other processing apparatuses 14A, 14C, and 14D returns a response showing whether it registered the ID information I to the predetermined processing apparatus 14B. In the case of the embodiment shown in FIG. 2B, the ID information I was registered by the processing apparatus 14A, so that this processing apparatus 14A transmits a response (Yes) showing that it registered the ID information I to the predetermined processing apparatus 14B.

On receiving this response, the predetermined processing apparatus 14B transmits a response Res showing that the processing apparatus 14A registered the ID information I to the reading apparatus 12A.

On receiving this response Res, the reading apparatus 12A recognizes that the ID information I was registered at the processing apparatus 14A and delivers the image information S to this processing apparatus 14A (processing apparatus main body 16A and monitor 18A).

By doing so, it becomes possible to have the monitor 18A display a visible image of the image information S.

Figure 4B:
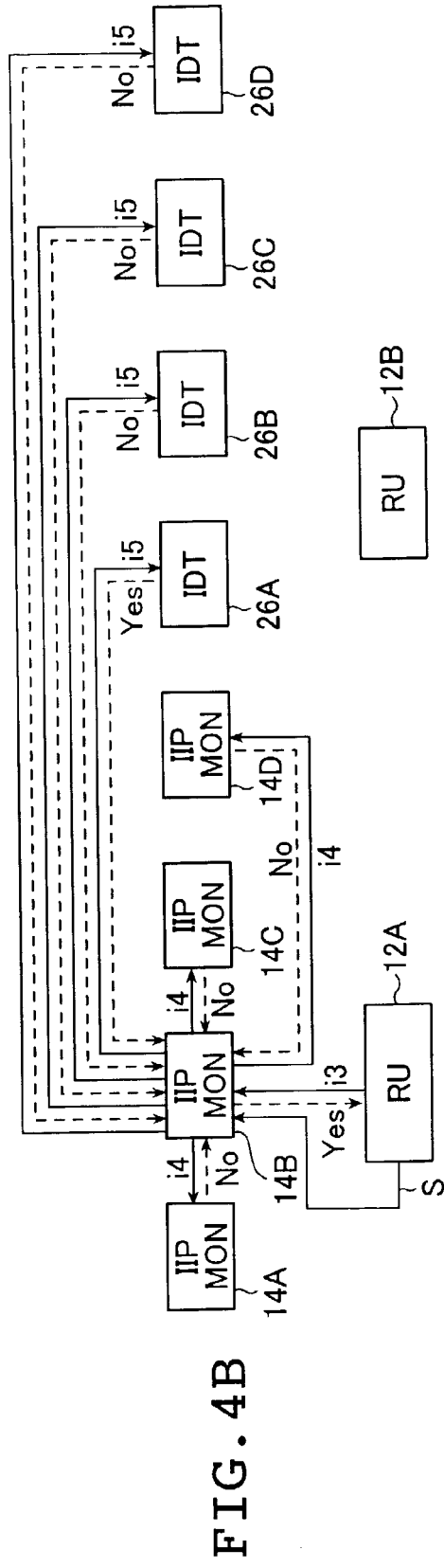

On the other hand, as shown in FIG. 4B, in the case where the processing apparatus 14B receives, from each of the other processing apparatuses 14A, 14C, and 14D, a response (No) showing that it did not register the ID information I, this processing apparatus 14B inquires of each of the ID terminals 26A to 26D whether it registered this ID information I (issues an inquiry i5).

On receiving the inquiry i5 from the processing apparatus 14D, each of the ID terminals 26A to 26D transmits a response showing whether it registered the ID information to the processing apparatus 14B.

The operations of the processing apparatus 14B and the reading apparatus 12A performed afterward are the same as those of the processing apparatus 14D and the reading apparatus 12A shown in FIG. 3B.

That is, the processing apparatus 14B receives a response from each of the ID terminals 26A to 26D. In this example, it is assumed that the processing apparatus 14B receives, from the ID terminal 26A, a response (Yes) showing that it registered the information, and receives, from each of other ID terminals 26B, 26C, and 26D, a response (No) showing that it did not register the information. Therefore, the processing apparatus 14B recognizes that the ID information I was registered at the ID terminal 26A and re-registers this ID information as ID information registered by itself using its internal registration function.

After the internal registration of the ID information I, the processing apparatus 14B re-issues a response (Yes) showing that it registered the ID information to the reading apparatus 12A.

Following this, the reading apparatus 12A recognizes that the ID information I was registered at the processing apparatus 14B and delivers the image information S to this processing apparatus 14B (processing apparatus main body 16B and monitor 18B).

When the processing apparatus 14B receives the image information S from the reading apparatus 12A, a visible image of the image information S is displayed by the monitor 18B and the radiographing technical confirms the displayed image. That is, for example, even in the case where the ID terminal 26A at which there was registered the ID information given to the radiographic image borne by the image information S does not have an image confirmation monitor and is not provided with an image confirmation function and this ID terminal 26A is not placed so as to correspond to a radiographing room or a radiographing apparatus at which the radiographic image borne by the image information S was taken (that is, placed at a reception desk or the like), for instance, it is possible for the radiographing technician to easily confirm the image borne by the image information S at the monitor 18B of the predetermined processing apparatus 14B.

Figure 5A:
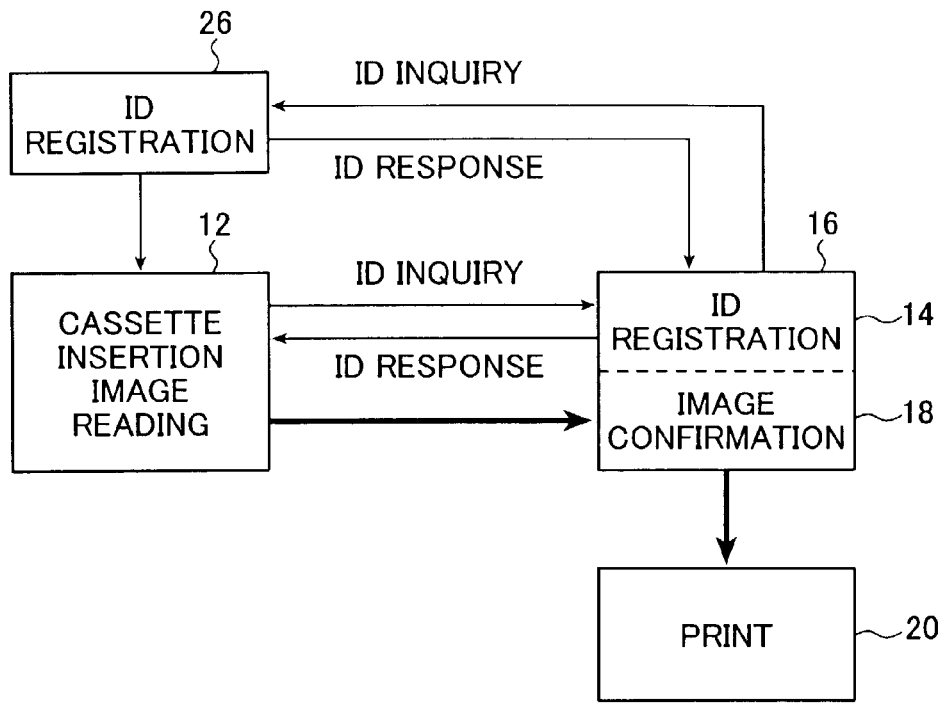
FIG. 5A is a system construction drawing illustrating a workflow of the image information processing system of the present invention.
Figure 5B:
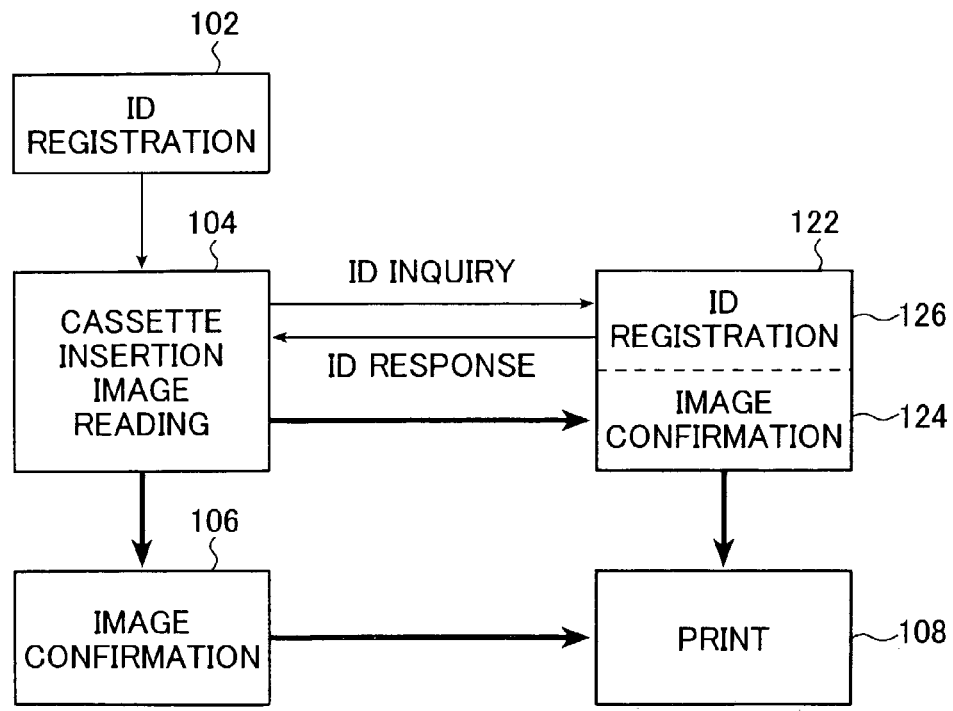
FIG. 5B is a system construction drawing illustrating a workflow of a conventional image information processing system.
Figure 6:
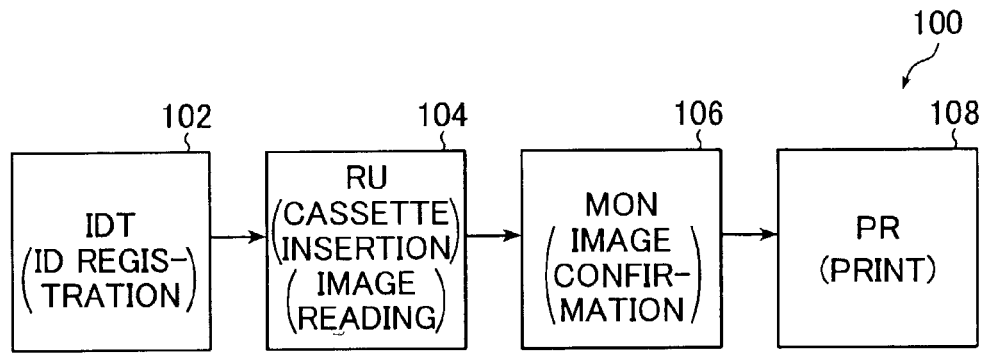
FIG. 6 is a drawing showing the system construction of an example of the conventional image information processing system.
Figure 7:
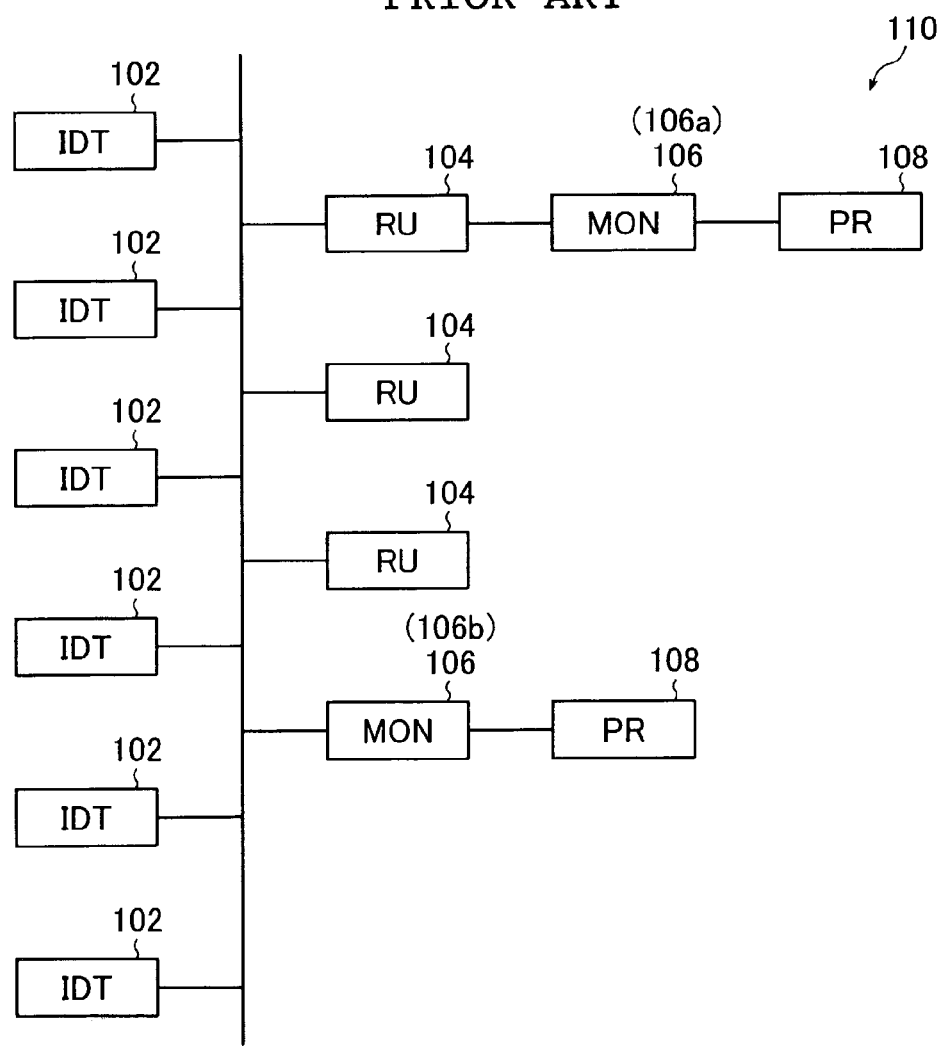
FIG. 7 is a drawing showing the system construction of another example of the conventional image information processing system.
Figure 8:
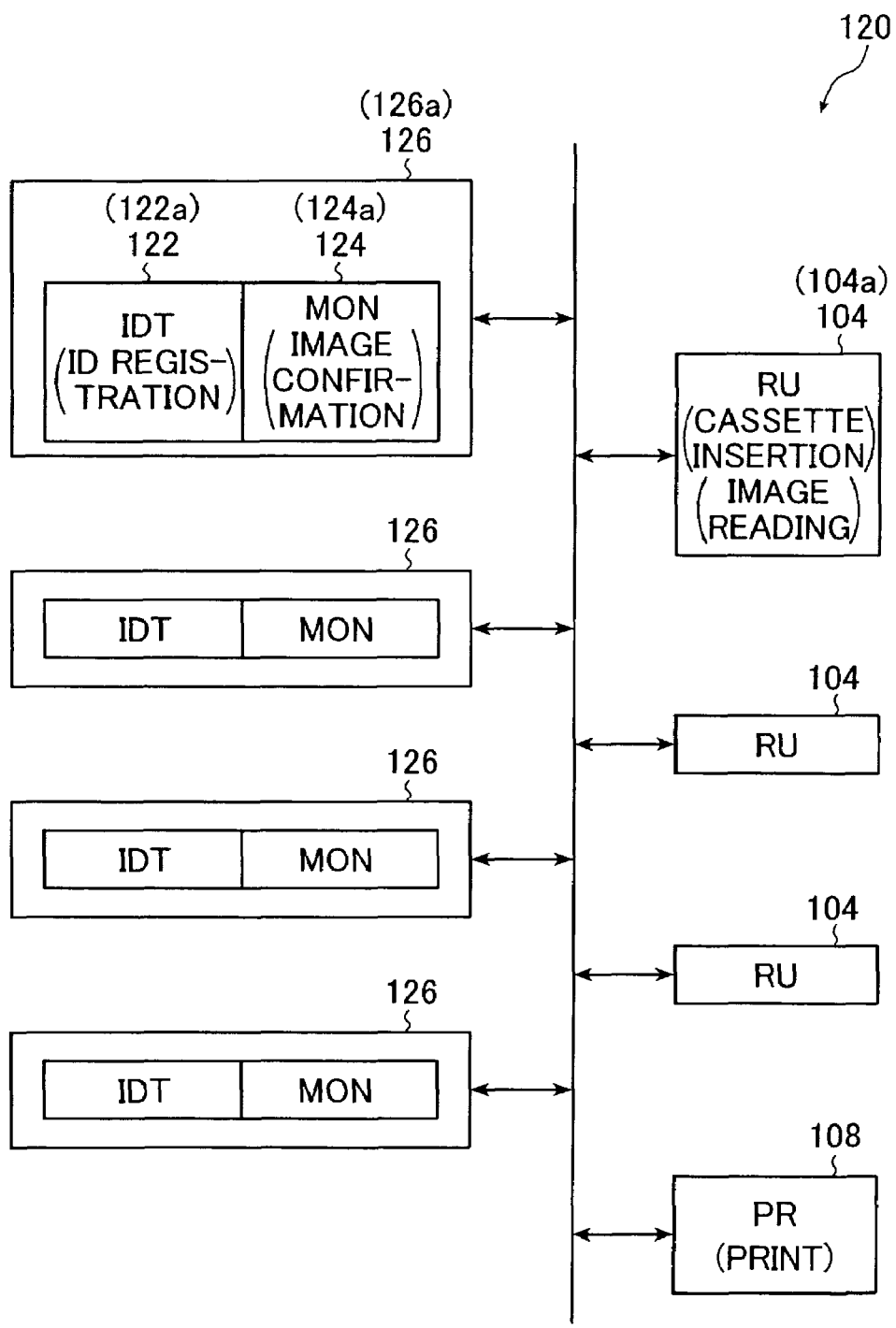
FIG. 8 is a drawing showing the system construction of still another example of the conventional image information processing system.

That is, in each embodiment of the present invention described above, as shown in FIG. 5A, it is possible to process image information read from a sheet having ID information registered at the ID terminal 26 which does not have the image confirming function, as well as image information read from a sheet having ID information registered at the processing apparatus main body 16 of the processing apparatus 14 to which the image display monitor 18 is attached. That is, the ID information registered at the ID terminal 26 is internally registered (re-registered) at the processing apparatus main body 16 of the processing apparatus 14, so that it becomes possible to display an image using the image display monitor 18 that corresponds to the processing apparatus main body 16 of the processing apparatus 14 in a one-to-one relationship and to confirm the displayed image. In the case where it has been confirmed that the image displayed by the image display monitor 18 is appropriate, image information is transmitted from the processing apparatus main body 16 of the processing apparatus 14 to the printer 20, thereby making it possible to output a hard copy image on an X-ray film or the like.

It should be noted here that there may be obtained a form where when transmitting ID information (patient information and radiographing information may be included) to the reading apparatus, each processing apparatus or ID terminal further transmits its identifier (address or the like) so as to be associated with the ID information. In this case, it is possible for the reading apparatus to recognize which processing apparatus registered ID information or is regarded as having registered the ID information (internally registered the ID information) without inquiring of any of the processing apparatuses.

The image information processing system according to the present invention has been described in detail above by explaining various embodiments. Needless to say, however, the present invention is not limited to these embodiments and various changes and modifications may be made without departing from the scope of the present invention.

As described in detail above, with the technique of the present invention, even if an image information processing apparatus, which has an identification information registering function of registering identification information (including subject information) of a sheet (on which an image was recorded or is to be recorded) and an image confirmation function of confirming an image received from the image information reading apparatus, and an identification information registration specialized terminal, which has only a function of registering identification information and does not have an image confirmation function, coexist on a network on which there is provided an image information reading apparatus that reads image information from a sheet on which an image of a subject such as a radiographic image of a patient, has been recorded, it becomes possible to unify the delivery destination of the read image information and to unify a place at which a system user, a system operator, or a radiographing technician confirms an image. As a result, it becomes possible to unify a workflow from the registration of identification information of a sheet, through the reception of read image information over a network, to the confirmation, display, and output of an image.

What is claimed is:

1. An image information processing system comprising:
at least one image information processing apparatus having an identification information registration function of registering identification information of a sheet, which is to be used when an image of a subject is taken and recorded, and an image confirmation function;
at least one identification information registration specialized apparatus that performs only registration of the identification information and does not have the image confirmation function;
at least one image information reading apparatus in which the sheet, on which the image has been taken and recorded, is loaded and which reads image information of the image from the loaded sheet; and
means for establishing network-connection among said at least one image information processing apparatus, said at least one identification information registration specialized apparatus, and said at least one image information reading apparatus,
wherein one image information processing apparatus among said at least one image information processing apparatus automatically receives, from one image information reading apparatus among said at least one image information reading apparatus, the image information read by said one image information reading apparatus from the sheet having the identification information registered using the identification registration function of said one image information processing apparatus, and performs image confirmation using its own image confirmation function, and if the image information is read by said one image information reading apparatus from the sheet having the identification information registered by said one identification information registration specialized apparatus among said at least one identification information registration specialized apparatus, said image information processing apparatus confirms which identification information registration specialized apparatus registered the identification information, internally registers the identification information using its own identification information registration function, automatically receives the image information from said one image information reading apparatus, and performs the image confirmation using its own image confirmation function.

2. The image information processing system according to claim 1, wherein said one image information reading apparatus reads, from the loaded sheet, the identification information given to the sheet, inquires of said at least one image information processing apparatus whether it registered the identification information, receives, from an image information processing apparatus that registered the identification information, a response showing that it registered the identification information, and delivers the image information to said image information processing apparatus, if no image processing apparatus returns the response for the inquiry showing that it registered the identification information, said image information reading apparatus causes a predetermined image information processing apparatus among said at least one image information processing apparatus to inquire of said at least one identification information registration specialized apparatus whether it registered the identification information, on receiving, from said identification information registration specialized apparatus registered the identification information, the response showing that it registered the identification information, said predetermined image information processing apparatus internally registers the identification information using its own identification information registration function, and returns the response showing that it registered the identification information to said one image information reading apparatus, and said one image information reading apparatus delivers the image information to said predetermined image information processing apparatus that returned the response showing that it registered the identification information.

3. The image information processing system according to claim 1, wherein said one image information reading apparatus reads, from the loaded sheet, the identification information given to the sheet, inquires, of a predetermined image information processing apparatus among at least one image information processing apparatus which image information processing apparatus registered the identification information, receives a response from said predetermined image information processing apparatus, and delivers the image information to an image information processing apparatus that registered the identification information, wherein if said predetermined image information processing apparatus registered the identification information, said predetermined image information processing apparatus returns a response showing that it registered the identification information to said one image information reading apparatus, if said predetermined image information processing apparatus did not register the identification information, said predetermined image information processing apparatus inquires of each of other image information processing apparatuses whether it registered the identification information, receives a response from an image information processing apparatus that registered the identification information, returns a response showing which image information processing apparatus registered the identification information to said one image information reading apparatus, and if there is not returned, from any image information processing apparatus, the response showing that it registered the identification information, said predetermined image information processing apparatus inquires of said at least one identification information registration specialized apparatus whether it registered the identification information, receives, from an identification information registration specialized apparatus that registered the identification information, the response showing that it registered the identification information, internally registers the identification information using its own identification information registration function, and returns a response showing that said predetermined image information processing apparatus registered the identification information to said one image information reading apparatus.

4. The image information processing system according to claim 1, wherein said image information processing apparatus and said identification information registration specialized apparatus register information concerning the subject and the image thereof in addition to identification information of the sheet, on which the image of the subject is to be recorded, so as to be associated with each other, and during the internal registration of the identification information, said image information processing apparatus receives the information concerning the subject and the image thereof associated with the identification information from an identification information registration specialized apparatus that registered the identification information.

* * * * *